Patented Oct. 31, 1933

1,932,755

UNITED STATES PATENT OFFICE 1,932,755

PRODUCTION OF PROPIONIC ACID

Hugh R. Stiles, Terre Haute, Ind., and Perry W. Wilson, Madison, Wis., assignors to Commercial Solvents Corporation, Terre Haute, Ind., a corporation of Maryland No Drawing. Application June 26, 1930
Serial No. 464,123

16 Claims. (Cl. 260—120)

This invention relates to a process for the production of volatile aliphatic acids by fermentation. More specifically, this invention relates to a process for the production of propionic and acetic acid by the fermentation of hydrolyzed starchy materials.

It has long been known that propionic and acetic acid may be produced by the fermentation of sugars, organic salts such as lactates, etc. For this purpose molasses has been used as a cheap raw material either for the direct fermentation, or for the production of calcium lactate which is then subjected to the propionic fermentation. The use of molasses, however, has certain inherent disadvantages from a commercial standpoint, principally in that long periods of time are required for the fermentation, and in addition the yields obtained are considerably lower than the theoretical based upon the raw material used.

This improved process overcomes these difficulties and provides a practical method of obtaining propionic and acetic acids from a cheap source of carbohydrate, which is quicker and generally more efficient than the former processes. This invention consists essentially in using the hydrolysis liquor from the acid hydrolysis of starchy materials as the source of carbohydrate either for the direct fermentation to propionic and acetic acids, or for the production of lactates to be subsequently fermented to propionic and acetic acids.

In carrying out this invention, such starchy materials as corn, barley, or other cereal grains, potatoes, etc., are subjected to hydrolysis by any of the known processes. By the term hydrolysis is meant not only hydrolyses using acid catalysts, but also processes in which malt or other diastatic enzyme preparations are used. In the latter case saccharifying enzymes rather than liquefying enzymes should be employed, in order that the starch be transformed into sugars instead of into soluble starch, dextrins, or other intermediates which are less available to the organisms. If the acid hydrolysis is employed, any of the known acid catalysts may be used, for example hydrochloric, sulphuric, phosphoric, etc. In carrying out this invention it is preferred to use hydrochloric acid, according to the following procedure.

Degerminated corn meal is made up with water to about 20% concentration, dry weight, 0.1 to 0.5% hydrochloric acid is added, and the mixture heated under pressure. For example, 105 pounds of degerminated meal (10% moisture), 460 pounds water, and 4.2 pounds concentrated hydrochloric acid (0.27% by weight based on total weight of meal and water) are charged into an autoclave, and the mixture heated for about 45 min. at 40 pounds steam pressure. The resulting sugar solution is found to contain about 15% sugar.

It is to be distinctly understood that the above example is in no way to limit the scope of this invention. Although it is preferred to use corn meal and to follow the procedure outlined above, this invention is in no way dependent upon the use of any particular starchy material, or upon any particular method of hydrolysis.

It has been found that the sugar solutions obtained by the above procedure, or by other hydrolyses, are eminently suitable for the propionic acid fermentation, either by direct fermentation with propionic bacteria, or propionic and lactic bacteria, or by the indirect method of fermenting first with lactic bacteria and then fermenting the resulting lactates with propionic bacteria.

The following examples, with the results of corresponding molasses fermentations, will serve to illustrate the method of carrying out this invention and will show the advantage to be gained over the old process of using molasses.

The 15% sugar solution obtained in the hydrolysis as outlined above is diluted to about 5% concentration, and the preferred manner of accomplishing this is to add 2 parts of sterile slop obtained from the butyl-acetonic fermentation process to 1 part of the hydrolysis liquor. A calculated excess of calcite is added, the mass inoculated, and the fermentation carried out at 30° C.

Direct propionic fermentation

| Carbohydrate | Culture | Days | Propionic and acetic acids | Lactic acid | Sugar |
|---|---|---|---|---|---|
| Hydrolysis liquor (5% sugar). | Propionic + lactic. | 7 | % 3.27 | % 0.44 | % 0.11 |
| Molasses (5% sugar) | Propionic + lactic. | 8 | 2.43 | 1.97 | 0.33 |

Lactic—Propionic fermentation

| Carbohydrate | Culture | Days | Propionic and acetic acids | Lactic acid | Sugar |
|---|---|---|---|---|---|
| Hydrolysis liquor (5% sugar). | Lactic | 5 | % 0.31 | % 4.05 | % 0.73 |
|  | Propionic + lactic. | 15 | 4.09 | 0.45 | 0.32 |
| Molasses (5% sugar) | Lactic | 8 | 0.31 | 3.04 | 1.87 |
|  | Propionic + lactic. | 17 | 3.62 | 0.65 | 0.19 |

In the above examples the lactic culture used was *Lactobacillus casei*, and the propionic culture, *Bacterium acidi propionici*. It is to be understood, however, that although it is preferred to use these organisms, this invention is in no way to be limited to the use of any particular cultures. For example, other propionic acid bacteria, such as are described in the treatise of C. B. Van Niel, "The Propionic Acid Bacteria" (N. V. Uitgeverszaak, J. W. Boissevain and Co.; Haarlem, 1928), may be used. Lactic acid bacteria other than *Lactobacillus casei* may be used; for example, *Streptococcus lactis*, or others of the organisms described on pages 241–255 of Bergey's "Manual of Determinative Bacteriology" (1923 edition). Also, accelerating organisms other than lactic acid bacteria may be employed in conjunction with the propionic acid bacteria. For example, the members of the Proteus group (pages 209–211 of Bergey's "Manual of Determinative Bacteriology") or the members of the Alcaligines group (pages 233–237 of Bergey's "Manual of Determinative Bacteriology") may be used.

It is obvious, also, that the procedure outlined above may be widely varied without departing from the spirit of this invention. For example, the hydrolysis liquor may be diluted with yeast water, other fermentation slops, steep water, etc., or may be made up with water and other forms of nutrients such as phosphates, ammonium salts, various proteins, etc., added according to the known art of fermentation. Other means of neutralization may be employed; for example, the fermentation may be neutralized continuously or intermittently with a soluble alkaline material such as soda ash. The fermentation process itself may be modified in a number of ways. For example, it has been found advantageous to add to the fermenting mash sufficient finely divided inert matter such as kieselguhr, "Filter-Cel", etc., to occupy one-fourth to one-half of the volume of the fermenting liquor. This inert material then acts as a support for the bacteria so that when a fermentation has proceeded substantially to completion, the clear upper liquor may be drawn off and new carbohydrate added to the residue which contains the greater portion of the bacteria, thus serving as the inoculum for a new fermentation and appreciably lessening the length of time required to complete subsequent fermentations. As will be apparent to one skilled in the art, the process may be modified slightly in various respects to obtain optimum conditions for the particular strains of organisms selected.

The invention now having been described, what is claimed is:

1. A process for the production of propionic and acetic acids which comprises subjecting a mash containing hydrolyzed starchy material to fermentation by a culture containing propionic acid bacteria.

2. A process for the production of propionic and acetic acids which comprises subjecting a mash comprising the liquor from the hydrolysis of starchy material and nitrogenous nutrients to fermentation by a culture containing propionic acid bacteria.

3. A process for the production of propionic and acetic acids which comprises subjecting a mash comprising the liquor from the hydrolysis of corn meal and nitrogenous nutrients to fermentation by a culture containing propionic acid bacteria.

4. A process for the production of propionic and acetic acids which comprises subjecting a mash containing hydrolyzed starchy material to fermentation by a culture comprising propionic acid bacteria and lactic acid bacteria.

5. A process for the production of propionic and acetic acids which comprises subjecting a mash comprising the liquor from the hydrolysis of starchy material and nitrogenous nutrients to fermentation by a culture comprising propionic acid bacteria and lactic acid bacteria.

6. A process for the production of propionic and acetic acids which comprises subjecting a mash comprising the liquor from the hydrolysis of corn meal and nitrogenous nutrients to fermentation by a culture comprising propionic acid bacteria and lactic acid bacteria.

7. A process for the production of propionic and acetic acids which comprises subjecting a mash containing hydrolyzed starchy material to fermentation by a culture containing lactic acid bacteria in the presence of a neutralizing agent, and subjecting the resulting liquor containing lactates to fermentation by a culture containing propionic acid bacteria.

8. A process for the production of propionic and acetic acids which comprises subjecting a mash comprising the liquor from the hydrolysis of starchy material and suitable nutrients to fermentation by a culture containing lactic acid bacteria in the presence of a neutralizing agent, and subjecting the resulting liquor containing lactates to fermentation by a culture containing propionic acid bacteria.

9. A process for the production of propionic and acetic acids which comprises subjecting a mash comprising the liquor from the hydrolysis of corn meal and nitrogenous nutrients to fermentation by a culture containing lactic acid bacteria in the presence of a neutralizing agent, and subjecting the resulting liquor containing lactates to fermentation by a culture containing propionic acid bacteria.

10. A process for the production of propionic and acetic acids which comprises subjecting a mash containing hydrolyzed starchy material to fermentation by a culture comprising lactic acid bacteria in the presence of a neutralizing agent, and subjecting the resulting liquor containing lactates to fermentation by a culture comprising propionic acid bacteria and lactic acid bacteria.

11. A process for the production of propionic and acetic acids which comprises subjecting a mash comprising the liquor from the hydrolysis of starchy material and suitable nutrients to fermentation by a culture comprising lactic acid bacteria in the presence of a neutralizing agent, and subjecting the resulting liquor containing lactates to fermentation by a culture comprising propionic acid bacteria and lactic acid bacteria.

12. A process for the production of propionic and acetic acids which comprises subjecting a mash comprising the liquor from the hydrolysis of starchy material and nitrogenous nutrients to fermentation by a culture containing lactic acid bacteria in the presence of a neutralizing agent, and subjecting the resulting liquor containing lactates to fermentation by a culture comprising propionic acid bacteria and lactic acid bacteria.

13. A process for the production of propionic and acetic acids which comprises subjecting a mash comprising the liquor from the acid hydrolysis of corn meal and slop from the butyl acetonic fermentation by a culture containing *Bacterium acidi propionici*.

14. A process for the production of propionic and acetic acids which comprises subjecting a mash comprising the liquor from the acid hydrolysis of corn meal and slop from the butyl acetonic fermentation to fermentation by a culture comprising *Bacterium acidi propionici* and *Lactobacilus casei*.

15. A process for the production of propionic and acetic acids which comprises subjecting a mash comprising the liquor from the acid hydrolysis of corn meal and slop from the butyl-acetonic fermentation to fermentation by a culture comprising lactic acid bacteria in the presence of a neutralizing agent, and subjecting the resulting liquor-containing lactates to fermentation by a culture comprising *Bacterium acidi propionici* and *Lactobacillus casei*.

16. A process for the production of propionic and acetic acids which comprises subjecting a mash comprising the liquor from the acid hydrolysis of corn meal and slop from the butyl-acetonic fermentation to fermentation by a culture comprising *Lactobacillus casei* in the presence of a neutralizing agent, and subjecting the resulting liquor containing lactates to fermentation by a culture comprising *Bacterium acidi propionici* and *Lactobacillus casei*.

HUGH R. STILES.
PERRY W. WILSON.